_United States Patent Office_

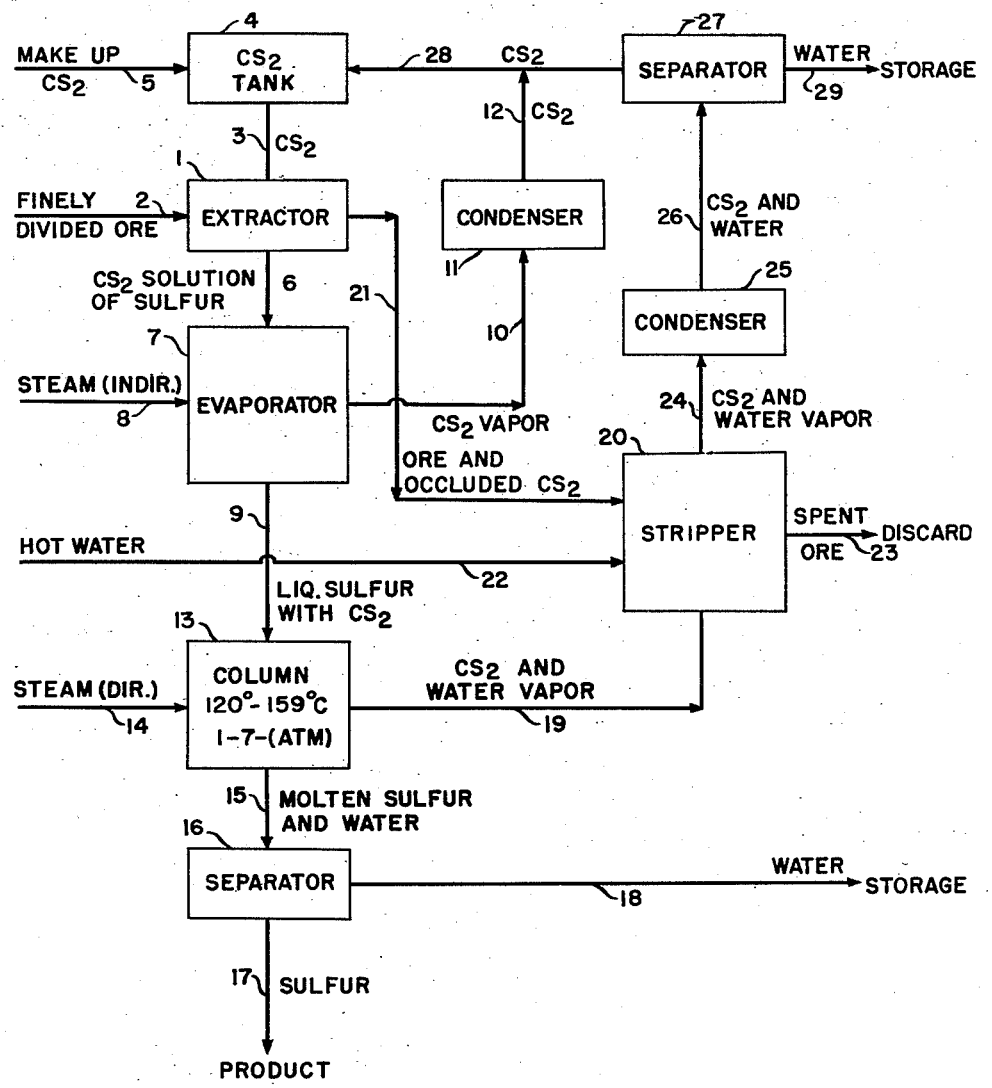

2,798,034
Patented July 2, 1957

2,798,034
PROCESS FOR RECOVERY OF SULFUR FROM ELEMENTAL-SULFUR-BEARING ORE

Robert B. Egbert, Roslyn Heights, and David Brown, New York, N. Y., assignors to Chempatents, Inc., New York, N. Y., a corporation of Delaware Application May 13, 1953, Serial No. 354,672

8 Claims. (Cl. 202—46)

This invention relates to processes for recovering elemental sulfur from carbon disulfide solutions thereof by vaporizing most of the carbon disulfide at a temperature in the range of about 50 to 159° C. and then steam distilling the rest of the carbon disulfide therefrom at a temperature in the range of 120° to 159° C. and at the corresponding steam pressure, and more particularly to such a process wherein the carbon disulfide solution of the sulfur is prepared by leaching elemental-sulfur-bearing ore or other crude material with carbon disulfide and separating the resulting extract phase or solution.

Sulfur is a very important and critical chemical material. Large amounts thereof are present in elemental form in certain volcanic ores, and various methods have been proposed heretofore for recovering this elemental sulfur. Some of these involve the extraction of the sulfur therefrom using carbon disulfide as a solvent; and recovering the sulfur from the resulting solution by crystallization of the sulfur, or spray drying the carbon disulfide therefrom. However, these processes leave much to be desired from the commercial viewpoint, especially as to the recovery of the last traces of the very expensive carbon disulfide solvent. The art is confronted with the problem of recovering the elemental sulfur from such ores or analogous materials in an economic and commercially interesting manner.

It has been found in accordance with the invention that elemental sulfur can be recovered in a highly efficient and economical manner from carbon disulfide solutions thereof by vaporizing most of the carbon disulfide at a temperature in the range of about 50 to 159° C. and then steam distilling the rest of the carbon disulfide therefrom at a temperature in the range of 120 to 159° C. and at the corresponding saturated steam pressure.

The objects achieved in accordance with the invention, as described herein, include the provision of a process for recovering elemental sulfur from a carbon disulfide solution thereof by vaporizing most of the carbon disulfide at a temperature in the range of about 50 to 159° C. and then steam distilling the rest of the carbon disulfide therefrom at a temperature in the range of 120 to 159° C. and at the corresponding steam pressure; the provision of such a process wherein the distillation is carried out at a temperature in the range of 130 to 155° C. and a pressure of one to seven atmospheres; the provision of such a process wherein a mixture of water and molten sulfur is withdrawn as still bottoms, and water is separated therefrom; the provision of such a process wherein the carbon disulfide solution of sulfur is obtained by extracting ground mineral material containing elemental sulfur with carbon disulfide, and recovering occluded carbon disulfide from the spent mineral material and reusing it in the process; and other objects which will be apparent as details or embodiments of the invention are set forth hereinafter.

The attached drawing illustrates the invention diagrammatically.

In order to facilitate a clear understanding of the invention, the following preferred specific embodiments are described in detail.

Example 1

Referring to the accompanying drawing, the finely divided elemental-sulfur-bearing ore is introduced into extractor 1 via line 2 and contacted with carbon disulfide introduced thereinto via line 3 from tank 4. The resulting mixture of carbon disulfide and sulfur is passed therefrom via line 6 to evaporator 7 wherein the major part of the carbon disulfide is evaporated therefrom at 50 to 159° C., preferably with a final evaporating temperature of about 140° C., at low pressure, preferably at or near atmospheric, by means of indirect steam heat (e. g. in a coil or jacket, not shown; the spent steam or water being recycled to the boiler). The carbon disulfide vapor is passed therefrom via line 10 to condenser 11 wherein it is liquified and then passed via lines 12 and 28 to tank 4. The liquid mixture of sulfur and the remaining carbon disulfide is passed via line 9 to distillation column 13 wherein it is steam distilled at about 120 to 159° C., preferably 130 to 155° C. and one to seven atmospheres pressure; steam being introduced thereinto via line 14. The distillation column may be steam jacketed. Carbon disulfide and water vapors are passed therefrom via line 19 to stripper 20. The amount of steam therein is sufficient to supply the heat required in the stripper 20.

Spent ore and occluded carbon disulfide are passed from extractor 1 via line 21 to stripper 20, wherein carbon disulfide is removed therefrom, hot water being introduced thereinto via line 22. Spent ore is removed therefrom via line 23 and discarded. Carbon disulfide and water vapors are passed therefrom via line 24 to a second condenser 25 where they are condensed and the condensate is passed to separator 27 via line 26. Water is separated from the carbon disulfide and passed to storage via line 29; or it may be discarded. Carbon disulfide is passed therefrom via line 28 to tank 4; and additional or make-up carbon disulfide may be added thereto via line 5.

Molten sulfur and any liquid water in the bottoms are passed from column 13 via line 15 to separator 16 wherein water is separated and withdrawn and passed to storage via line 18; or it may be discarded. The remaining sulfur is removed therefrom via line 17 and passed to product storage.

The concentrated sulfur solution which is passed to column 13 preferably contains a minimum of carbon disulfide; e. g. only the concentration of carbon disulfide which is in equilibrium with carbon disulfide vapor at atmospheric pressure and the temperature in the evaporator 7. If the temperature in the evaporator is too low, or the carbon disulfide concentration in the solution passed to column 7 is too high, there is an undue consumption of steam in the latter.

In accordance with the invention, the steam consumption per ton of sulfur is of the order of 0.7 ton of steam. On the other hand, if evaporator 7 is not included, and the solution from extractor 1 is all processed in column 13, the steam consumption is of the order of 1.7 tons of steam per ton of sulfur. Thus, it is evident that the process of the invention provides a more than 2-fold advantage from the viewpoint of steam economy, a major factor in the process.

The ore or analogous raw material should contain from 5 to 99% of elemental sulfur, desirably 15 to 99%. The lower economic limit is dependent upon such factors as the cost of mining and crushing the crude ore, but the process can operate with almost any concentration of sulfur. The extraction step may be carried out at elevated temperatures below the boiling point of the carbon disulfide. At atmospheric pressure this solvent boils at about 46° C., and at this temperature a saturated solution therein contains about 66% by weight sulfur; in other words, 100 parts by weight of the carbon disulfide dissolves about 180 parts by weight of sulfur. Somewhat lower extraction temperatures may be more convenient, e. g. 30 to 45° C., preferably 40 to 45° C. Elevated pressures may be employed if higher extraction temperatures are desired. The extraction may be carried out under a blanket or seal of liquid water, for instance as described in the U. S. Patents 1,963,921 and 2,888,190.

The evaporator may be of the usual type; or a series thereof may be used with a stepwise increase in temperature therein.

The distillation column may be of the tray type, e. g. of 10 to 30 trays, preferably 20, or an equivalent packed column. The feed thereto may be introduced near the top. The carbon disulfide and water vapors are taken off as overhead, and the molten sulfur taken off as bottoms; it may also contain some liquid water. The still may be provided with the usual regulating device to control the temperature and pressure, so that the distillation temperature is in the range of 120 to 159° C. and the pressure is not greater than the corresponding steam pressure.

The carbon disulfide and water form separate layers in separator 27, the water layer being the upper layer. The water separated therefrom contains a small amount of carbon disulfide and it may be passed to storage and reused in the process. The liquid sulfur and any water therein form separate layers in separator 16, the water being in the upper layer. The water separated therefrom may be passed to storage and reused in the process. If desired, the molten sulfur may be passed via line 11 into molds wherein it may be cooled in block form.

A number of separators analogous to separator 27 may be used, arranged in a parallel relationship, in order to allow ample time for the formation of the layers therein. Alternatively, centrifugal or equivalent separators may be used therefor, as well as for separator 16.

Generally, the distillation process is operative at any temperature between 120 and 159° C., and the pressure may be 1 to 7 atmospheres absolute. If the pressure is at least 2 atmospheres, no solid sulfur can be present in the column. The temperature of about 159° C. should not be exceeded, inasmuch as temperatures which are even a few tenths degree higher cause the sulfur to undergo a transition to a form which is extremely viscous and renders the column inoperable.

It is indeed surprising that elemental sulfur can be recovered from carbon disulfide solutions thereof in such an economical and convenient manner in accordance with the invention; especially, when compared with the heretofore suggested crystallization or spray drying techniques and their very cumbersome methods of removing the solidified sulfur.

In view of the foregoing discussions, variations and modifications of the invention will be apparent to one skilled in the art, and it is intended to include within the invention all such variations and modifications except as do not come within the scope of the appended claims.

We claim:

1. A process for recovering sulfur from carbon disulfide solutions thereof which comprises vaporizing most of the carbon disulfide at a temperature in the range of about 50 to 159° C. and then steam distilling the rest of the carbon disulfide therefrom at a temperature in the range of 120 to 159° C.

2. A process of claim 1 wherein the final vaporizing temperature is about 140° C.

3. A process of claim 2 wherein the distillation temperature is in the range of 130 to 155° C.

4. A process of claim 3 wherein a mixture of water and molten sulfur is obtained as the still residue, and water is separated therefrom.

5. In a process wherein a carbon disulfide solution of sulfur is obtained by extracting ground mineral material containing elemental sulfur with carbon disulfide, and occluded carbon disulfide is steam stripped from the spent mineral material and reused in the process, the improvement which comprises recovering the sulfur from said solution by vaporizing most of the carbon disulfide at a temperature in the range of about 50 to 159° C. and then steam distilling the rest of the carbon disulfide therefrom at a temperature in the range of 120 to 159° C.

6. A process of claim 5 wherein the final vaporizing temperature is about 140° C.

7. A process of claim 6 wherein the distillation temperature is in the range of 130 to 155° C.

8. A process of claim 7 wherein a mixture of water and molten sulfur is obtained as the still residue, and water is separated therefrom.

References Cited in the file of this patent

UNITED STATES PATENTS

| 1,409,338 | Fenton | Mar. 14, 1922 |

FOREIGN PATENTS

| 19 of 1874 | Great Britain | Jan. 2, 1874 |

OTHER REFERENCES

"Mellor's Modern Inorganic Chemistry," by Parkes p. 445), 1951 edition.